(12) United States Patent
Pautler

(10) Patent No.: US 10,429,151 B2
(45) Date of Patent: Oct. 1, 2019

(54) RECAPTURE OF REMOTELY-TRACKED COMMAND GUIDED VEHICLE INTO THE TRACKER'S FIELD-OF-VIEW

(71) Applicant: Raytheon Company, Waltham, MA (US)

(72) Inventor: Brian D. Pautler, The Colony, TX (US)

(73) Assignee: Raytheon Company, Waltham, MA (US)

( * ) Notice: Subject to any disclaimer, the term of this patent is extended or adjusted under 35 U.S.C. 154(b) by 214 days.

(21) Appl. No.: 15/621,484

(22) Filed: Jun. 13, 2017

(65) Prior Publication Data

US 2018/0356189 A1     Dec. 13, 2018

(51) Int. Cl.

| F41G 7/30 | (2006.01) |
|---|---|
| F41G 7/32 | (2006.01) |
| G05D 1/10 | (2006.01) |
| G01S 3/786 | (2006.01) |
| F41G 7/26 | (2006.01) |
| F41G 7/22 | (2006.01) |

(52) U.S. Cl.
CPC .............. *F41G 7/303* (2013.01); *F41G 7/32* (2013.01); *G01S 3/7864* (2013.01); *G05D 1/107* (2013.01); *F41G 7/2206* (2013.01); *F41G 7/26* (2013.01)

(58) Field of Classification Search
CPC ... F41G 7/303; F41G 7/32; F41G 7/26; F41G 7/2206; F41G 7/30; G01S 3/7864; G01S 17/66; G05D 1/107; F42B 10/64
See application file for complete search history.

(56) References Cited

U.S. PATENT DOCUMENTS

| 3,233,847 A | | 2/1966 | Girsberger | |
|---|---|---|---|---|
| 3,567,163 A | * | 3/1971 | Kepp | F41G 7/303 |
| | | | | 244/3.14 |
| 3,598,344 A | * | 8/1971 | Walters | F41G 7/30 |
| | | | | 244/3.11 |
| 3,603,686 A | * | 9/1971 | Paine | G01S 17/66 |
| | | | | 250/203.2 |
| 3,708,139 A | * | 1/1973 | Wheeler | F42B 10/64 |
| | | | | 244/3.13 |
| 3,711,046 A | | 1/1973 | Barhydt et al. | |
| 4,019,422 A | | 4/1977 | Magnuson | |

(Continued)

FOREIGN PATENT DOCUMENTS

GB     1605342 A     1/1992

*Primary Examiner* — Bernarr E Gregory
(74) *Attorney, Agent, or Firm* — Eric A. Gifford

(57) ABSTRACT

Upon loss of a valid track of a remotely-sensed command guided vehicle, a delta actuator command including an orthogonal component orthogonal to the straight-line path is generated as a next sample of a time-based alternating signal. The time-based delta actuator command is added to the nominal actuator command, which is "held" upon loss of valid track, to maneuver the vehicle in first and second orthogonal directions back and forth across the straight-line path to increase an area of vehicle motion relative to the tracker's FOV. This increases the likelihood of recapture of the vehicle given vehicle motion after track is broken. The penalty is a reduction in energy efficiency. In certain embodiments, this is accomplished without modification to guidance system hardware or the existing tracking valid or invalid guidance algorithms.

20 Claims, 10 Drawing Sheets

(56) References Cited

U.S. PATENT DOCUMENTS

| | | |
|---|---|---|
| 4,406,429 A | 9/1983 | Allen |
| 4,474,343 A | 10/1984 | Zwirn et al. |
| 4,666,103 A | 5/1987 | Allen |
| 4,705,237 A | 11/1987 | Goldfield et al. |
| 5,074,491 A * | 12/1991 | Tyson .................... F41G 7/303 244/3.11 |
| 5,799,899 A * | 9/1998 | Wells ..................... F41G 7/303 244/3.11 |

* cited by examiner

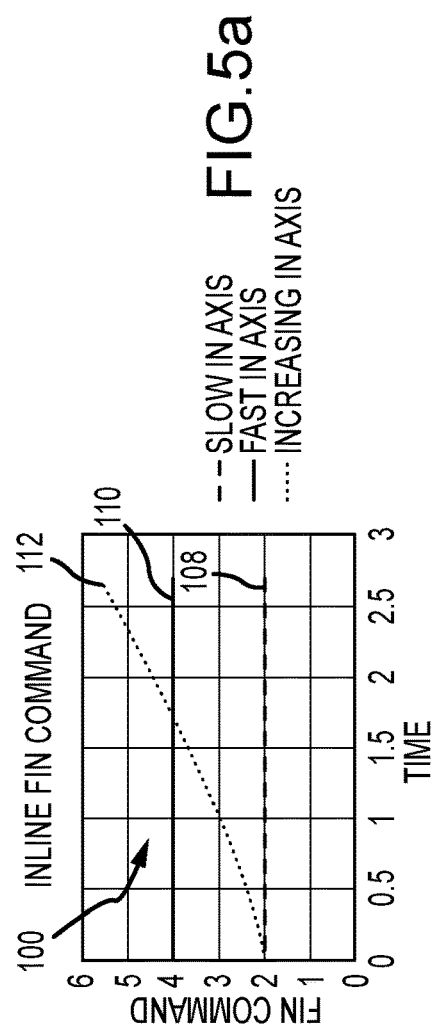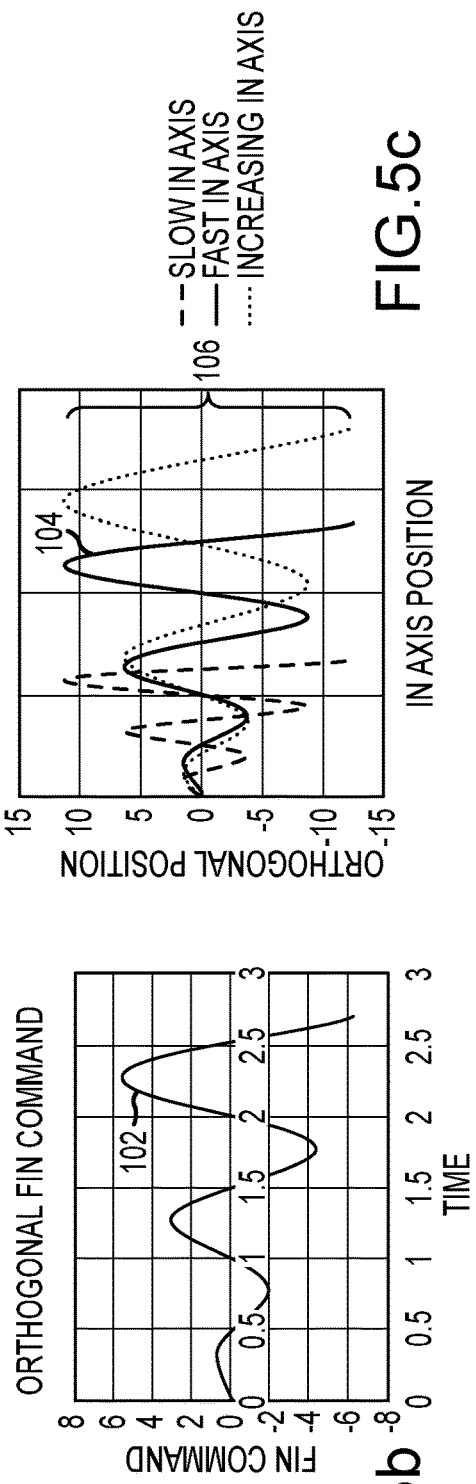

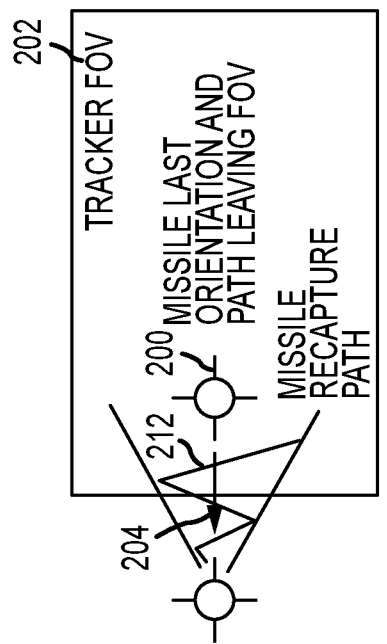
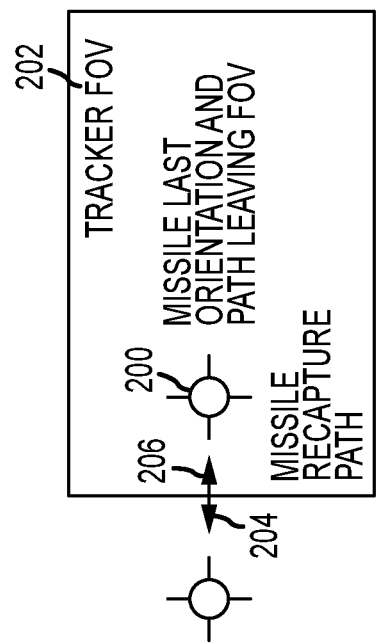

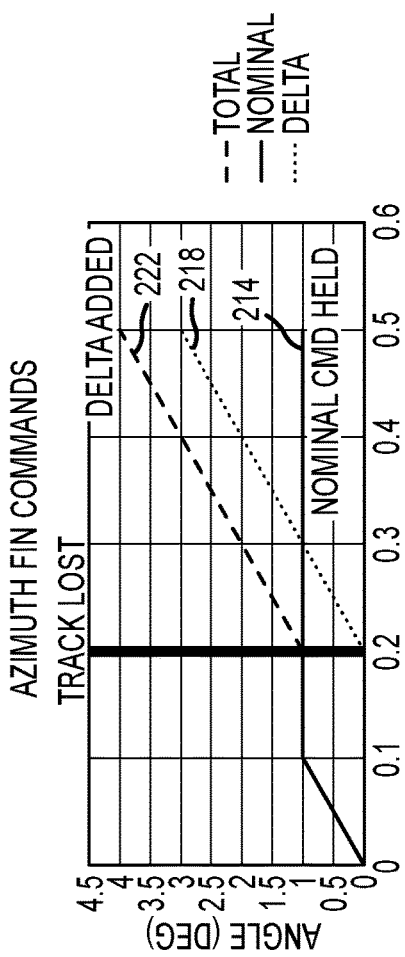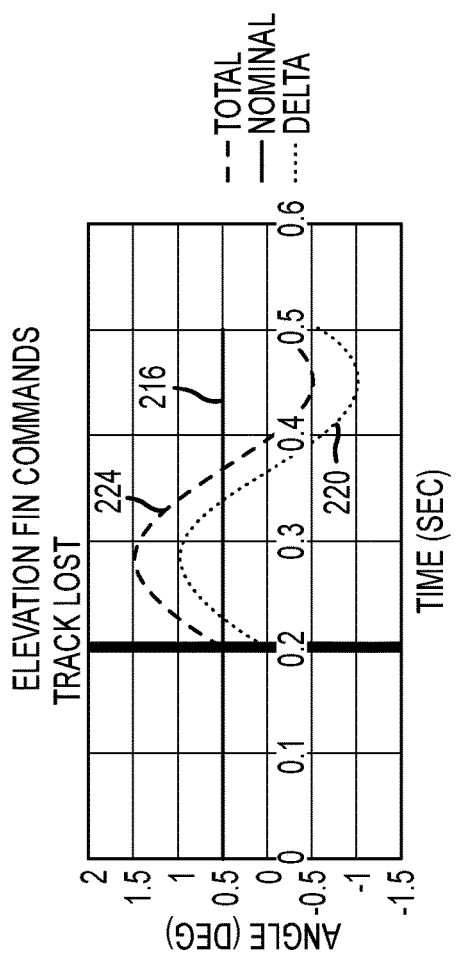

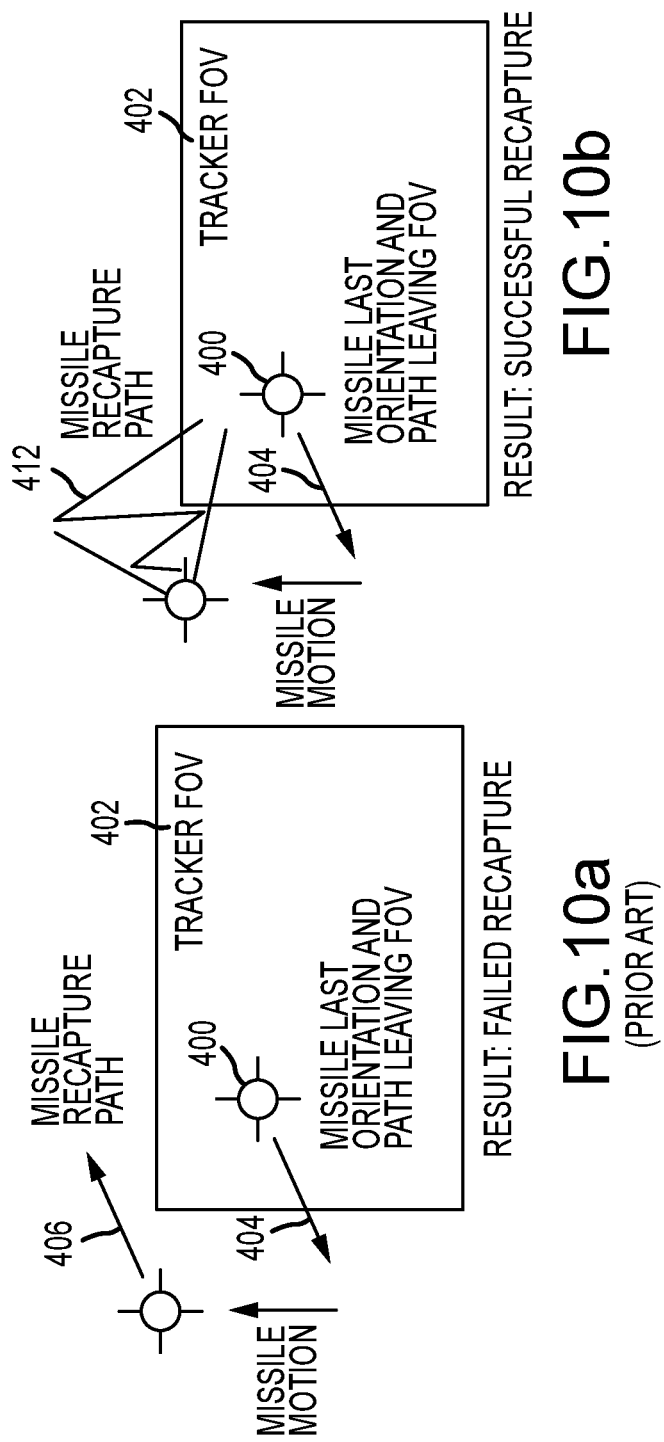

RECAPTURE OF REMOTELY-TRACKED COMMAND GUIDED VEHICLE INTO THE TRACKER'S FIELD-OF-VIEW

BACKGROUND OF THE INVENTION

Field of the Invention

This invention relates to remotely-tracked command guided vehicles such as a Tube-Launched, Optically Tracked, Wire-Guided (TOW) missile, aerial guided unmanned land vehicles or satellites and more particularly to recapture of the vehicle when the vehicle leaves the tracker's field-of-view (FOV).

Description of the Related Art

In its basic infantry form, a Tube-launched. Optically tracked. Wire-Guided ("TOW") missile system includes a missile in a sealed tube, which is clipped to a launch tube (or rail) prior to use. When required, the missile tube is attached to the rear of the launch tube, the target sighted and the missile fired. The launch motor (also called the "kick" motor or booster) ejects the missile from the launch tube, at which point four wings indexed at 45 degrees just forward of the booster nozzles spring open forwards, four tail control surfaces or "fins" flip open rearwards, and sustained propulsion is subsequently provided by the flight motor (sustainer) which fires through lateral nozzles amidships and propels the missile to the target. An optical sensor on the sight continuously monitors the position of a light source (e.g. the thermal signature of the hot motor) on the missile relative to the line-of-sight in a projectile coordinate system, and then corrects the trajectory of the missile by generating electrical signals that are passed down two wires, or more recently an RF link, to command the control surfaces to move the missile up/down and left/right. After launch, the operator simply has to keep the cross-hairs of his sight pointing at the target, and the guidance system will automatically transmit corrective commands to the missile through the wire. The TOW missile in its current variations is not a fire-and-forget weapon, and like most second-generation wire-guided missiles has Semi-Automatic Command Line of Sight guidance. This means that the guidance system is directly linked to the platform, and requires that the target be kept in the shooter's line of sight until the missile impacts.

The guidance system includes a signal processor that is coupled to the optical sensor to generate a measured missile position (e.g., Azimuth/Elevation (Az/El)) in the sensor's FOV and a track valid flag indicating the missile is within the FOV. The difference between the measured missile position and a desired missile position in the FOV (e.g., the cross-hairs or a known offset from the cross-hairs) forms an error signal. As long as the track valid flag is true, a controller generates control surface commands in the projectile coordinate system to maneuver the missile to reduce the error. The controller typically generates one command (e.g., Az) to a first pair of control surfaces to move the missile left and right and another command (e.g., El) to a second pair of control surfaces to move the missile up and down. The control surface actuator on the missile may be an analog or digital controller responsive to an angle command or a "bang-bang" controller responsive to a duty cycle modulation of a binary command. This closed-loop process repeats until the missile engages the target or track of the missile is lost and an abort command is issued.

The optical sensor has a narrow FOV, typically a couple degrees. The TOW missile system is used to engage targets at large stand off distances, over a few thousand meters. The FOV must be narrow to support these ranges. As such, it is not uncommon for the missile to fly out of the FOV and lose track. This might, for example, occur if the gunner jerks the cross-hairs or a gust of wind hits the missile in flight.

If track is lost, the signal processor switches the track valid flag to false. The controller then holds the last valid control surface command (e.g., Az/El) until either track is re-established and the track valid flag is true or an abort command is issued. Holding the last valid control surface command maneuvers the missile along a straight-line path towards the desired missile position (e.g., the cross-hairs) based on the last measured missile position before track was broken. The straight-line path is the best estimate to intersect the tracker's FOV based on the last measured missile position.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an increased likelihood of recapture of a remotely-sensed command guided vehicle given vehicle motion after track is broken. Upon loss of a valid track of the vehicle, a delta actuator command including an orthogonal component orthogonal to the straight-line path is generated as a next sample of a time-based alternating signal. The time-based delta is added to the nominal actuator command, which is "held" upon loss of valid track, to maneuver the vehicle in first and second orthogonal directions back and forth across the straight-line path to increase an area of vehicle motion relative to the tracker's FOV. The penalty is a reduction in energy efficiency. In certain embodiments, this is accomplished without modification to guidance system hardware or the existing tracking valid or invalid guidance algorithms.

In different embodiments, the time-based alternating signal increases in amplitude with time to increase the area of vehicle motion.

In different embodiments, a bias term is added to the time-based alternating signal to shape the area of vehicle motion. The bias term may include a constant, ramp, or exponential function of time.

In different embodiments, the delta actuator command also includes an inline term inline with the straight-line path to control the rate of motion of the vehicle along the straight-line path. The inline term may include a constant, ramp, or exponential function of time.

In different embodiments, the delta actuator command is a function of at least one of an elapsed time of travel, a range to a target, range from launcher, a vehicle velocity, the straight-line path and an elapsed time since the last valid track.

In different embodiments, the inline and orthogonal components are generated in a tracker coordinate system to define a generic search area. Using an angle of the straight-line path in the tracker coordinate system, the inline and orthogonal components are transformed into the projectile coordinate system.

In different embodiments, the vehicle is a land, air, sea or space based vehicles. Airborne vehicles may include, for example, projectiles such as missiles, rockets or artillery shells. The missile system may be a TOW missile system. Land vehicles may include, for example, an aerial guided unmanned rover.

In different embodiments, the actuators may comprise aerodynamic control surfaces such as fins, wings or canards, continuous or 1-shot thrusters or propellers, or rockets, or rudder.

In different embodiments, commands are transmitted over a wire, WIFI, radio, laser, optical or infrared link to the vehicle.

In different embodiments, commands transmitted to the vehicle are analog, digital or bang-bang.

In different embodiments, the remote tracking uses optical, infrared, radar or sonar sensing to determine vehicle position in the FOV.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a through 5c illustrate embodiments of inline and orthogonal actuator commands and the resulting vehicle motion in the tracker coordinate system;

FIGS. 6a and 6b illustrate a straight-line recapture path for the last valid command held and an alternating recapture path about the straight-line path for the total actuator command for a missile leaving the FOV horizontally to the left, respectively, resulting in a successful recapture;

FIGS. 7a and 7b illustrate the Azimuth and Elevation actuator commands rotated into projectile coordinate space for a missile leaving the FOV horizontally as shown in FIG. 6b and the recapture path of FIGS. 5a-5c;

FIGS. 10a and 10b illustrate a straight-line recapture path for the last valid command held and an alternating recapture path for the total actuator command for the missile leaving the FOV at a 45 degree angle and undergoing a displacement resulting in a failed recapture for the straight-line recapture path and a successful recapture for the alternating recapture path.

DETAILED DESCRIPTION OF THE INVENTION

Figure 1:
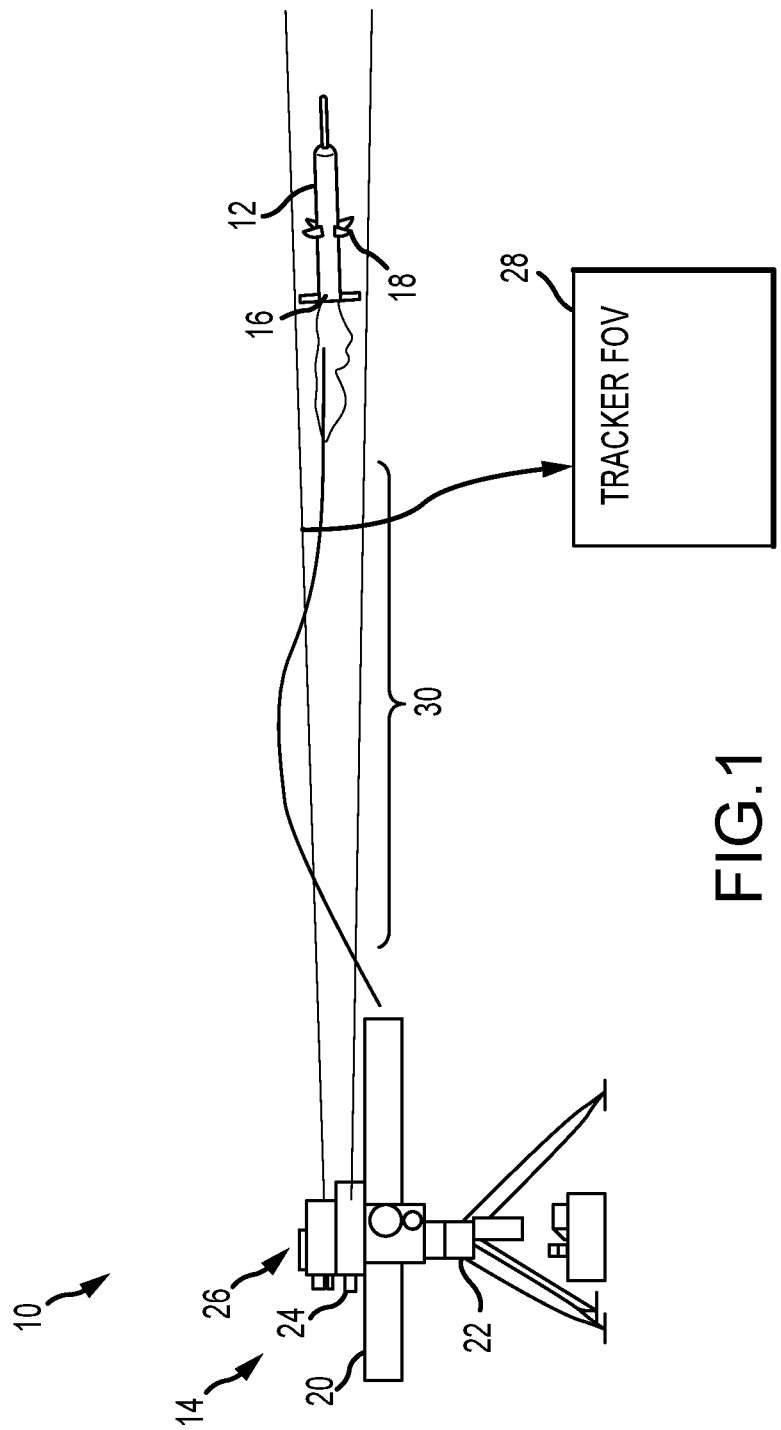
FIG. 1 is a diagram of an embodiment of a remotely-tracked command guided missile system.
Figure 2:
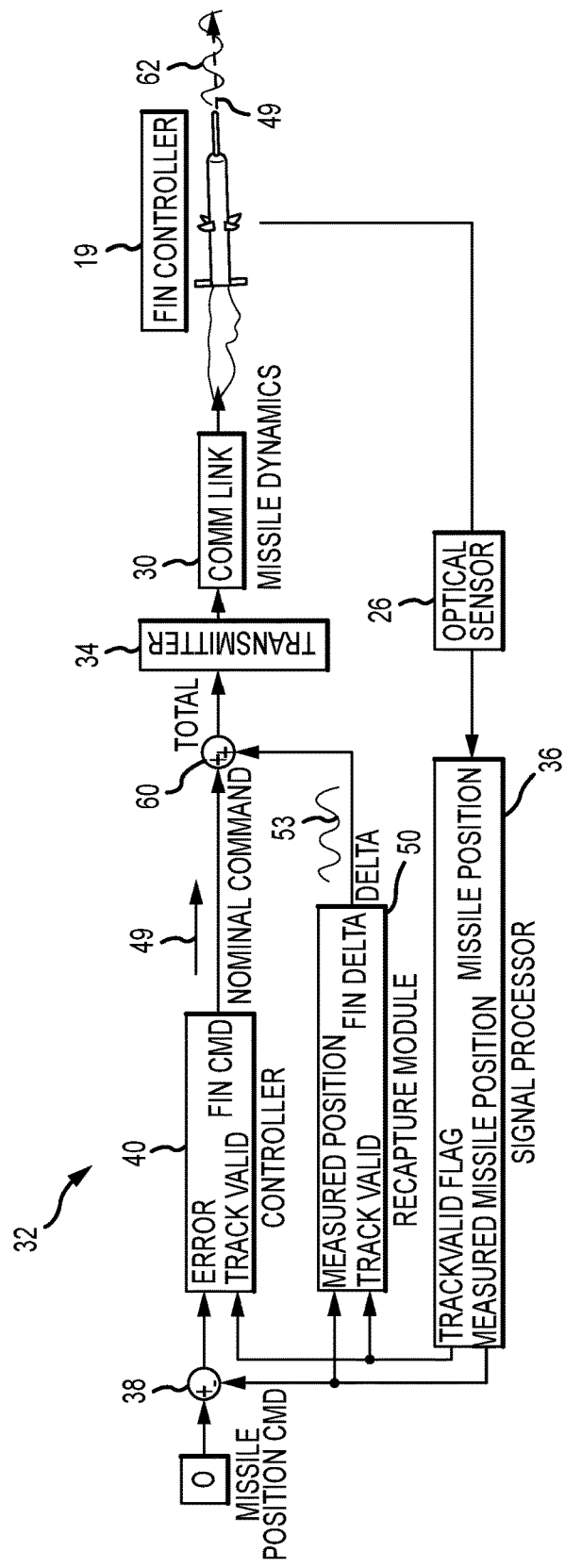
FIG. 2 is a block diagram of a missile guidance system in accordance with the present invention for recapture of the missile.
Figure 3B:
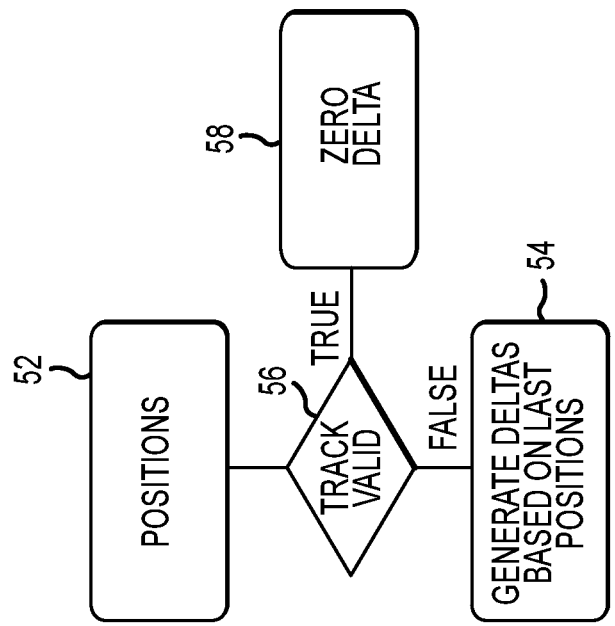
FIGS. 3a and 3b illustrate the function of the guidance system controller to generate nominal actuator commands when track is valid and to hold the last valid command when track is lost and of the recapture module to generate delta actuator commands when track is lost to increase an area of missile motion relative to the tracker's FOV for missile recapture.
Figure 3A:
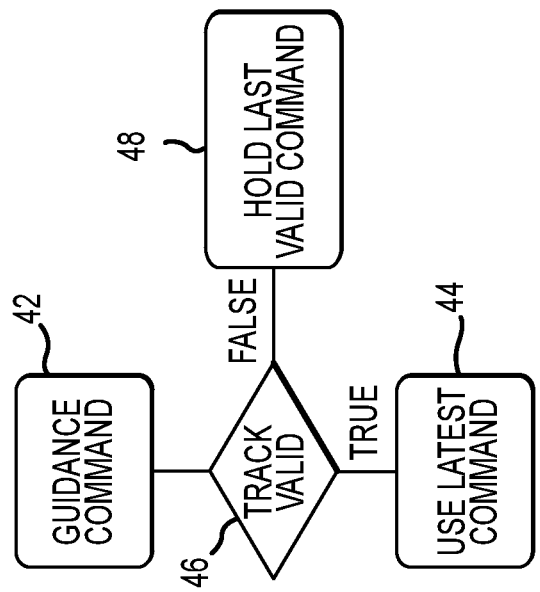

The existing approach of holding the last valid control surface command (e.g., Az/El) when track is lost to maneuver the vehicle along a straight-line path towards the desired vehicle position (e.g., the cross-hairs) based on the last measured vehicle position before track was broken is the best estimate to intersect the tracker's FOV assuming the vehicle did not move (e.g., rotate or shift) after track was broken.

However, if the vehicle does move after track is broken, the chance that the straight-line path based on the last measured vehicle position may fail to intersect the tracker's FOV increases significantly. A small rotation of or shift in position of the vehicle may put the vehicle on a straight-line path that does not intersect the tracker's FOV.

The present invention provides an increased likelihood of recapture of a remotely-sensed command guided vehicle given vehicle motion after track is broken. Upon loss of a valid track of the vehicle, the guidance system generates a delta actuator command including an orthogonal component orthogonal to the straight-line path as a next sample of a time-based alternating signal. The guidance system adds the time-based delta actuator command to the nominal actuator command, which is "held" upon loss of valid track, to maneuver the vehicle in first and second orthogonal directions back and forth across the straight-line path to increase an area of vehicle motion relative to the tracker's FOV. The penalty is a reduction in energy efficiency. In certain embodiments, this is accomplished without modification to guidance system hardware or the existing tracking valid or invalid guidance algorithms.

In different embodiments, the vehicle is a land, air, sea or space based vehicle. The actuators may comprise aerodynamic control surfaces such as fins, wings or canards, continuous or 1-shot thrusters or propellers, rudders, or rockets. The commands may be transmitted over a wire, WIFI, radio, laser, optical or infrared link to the vehicle. The transmitted commands transmitted may be configured for analog, digital or bang-bang control. Remote tracking may use optical, infrared, radar or sonar sensing to determine vehicle position in the FOV.

Without loss of generality, the present invention will be described in the context of a Tube-Launched, Optically Tracked, Wire-Guided (TOW) missile in which Azimuth (AZ) and Elevation (EL) actuator commands are generated at the missile launcher and transmitted over a pair of wires to actuate Az and El pairs of fins to guide the missile.

Referring now to FIGS. 1, 2 and 3a-3b, an embodiment of a TOW missile system 10 includes a missile 12 and a missile launcher 14 to launch and command guide the missile 12 to a target. Missile 12 includes a motor 16, a plurality of fins 18 and a fin controller 19 configured to adjust the fins 18 to maneuver the missile in first and second orthogonal directions in a projectile coordinate system. Missile 12 is typically provided in a sealed tube 20 that is mounted on the missile launcher 14.

Missile launcher 14 includes a platform 22 for mounting and launching the missile 12, a sight 24 for placement of cross-hairs on a target, an optical sensor 26 having a field of view (FOV) 28 that includes the cross-hairs, a communication link 30 such as a pair of wires between the missile launcher 14 and the missile 12, a guidance computer 32 for generating the Az and El actuator commands to maneuver the missile 12 towards the cross-hairs when track is valid and to maneuver the missile 12 for recapture when track is lost, and a transmitter 34 for transmitting the actuator commands over the communication link 30. Together components may be referred to as the Tracker.

Guidance computer 32 includes a signal processor 36 coupled to sensor 26. The signal processor 36 is configured to determine a missile position in the FOV 28 and set a track valid flag equals true if the missile 12 is detected in the FOV 28 and to generate a measured missile position in the FOV 28 and set the track valid flag equals false if the missile 12 is not detected. A first summing node 38 forms a difference of the measured missile position and a desired missile position (e.g., missile position command) in the FOV (e.g., the cross-hairs) as an error signal. A controller 40 is configured to generate "guidance commands" (step 42) as a new nominal actuator command (e.g., including Az and El components) to use a latest command based on the error signal (step 44) if the track valid flag is true (step 46) and to hold a last valid nominal actuator command (step 48) to place the missile 12 on a straight-line path 49 from a last known position of the missile 12 towards the desired missile position in the FOV 28 if the track valid flag is false (step 46). A recapture module 50 is configured to generate "positions" (step 52) as a delta actuator command based on last positions including an orthogonal component orthogonal 53 to the straight-line path 49 as a next sample of a time-based alternating signal (step 54) if the track valid flag is false (step 56) and a delta actuator command as a sequence of zeroes (step 58) if the track valid flag is true (step 56). A second summing node 60 sums the nominal actuator command and the delta actuator command to form a total actuator command. Transmitter 34 transmits the total actuator command from the missile launcher 14 over the communication link 30 to the missile 12 in flight to the fin controller 19 to control the plurality of fins 18 to command guide the missile 12 to maneuver in the first and second orthogonal directions to flying along an alternating path 62 back and forth across the straight-line path 49 to increase an area of missile motion relative to the tracker's FOV 28 until the missile 12 re-enters the tracker's FOV 28 and valid track is re-established or an abort command is issued. Increasing the area of missile motion relative to the tracker's FOV 28 as compared to the area for a straight-line path increases the likelihood of intersecting the tracker's FOV 28.

Figure 4:
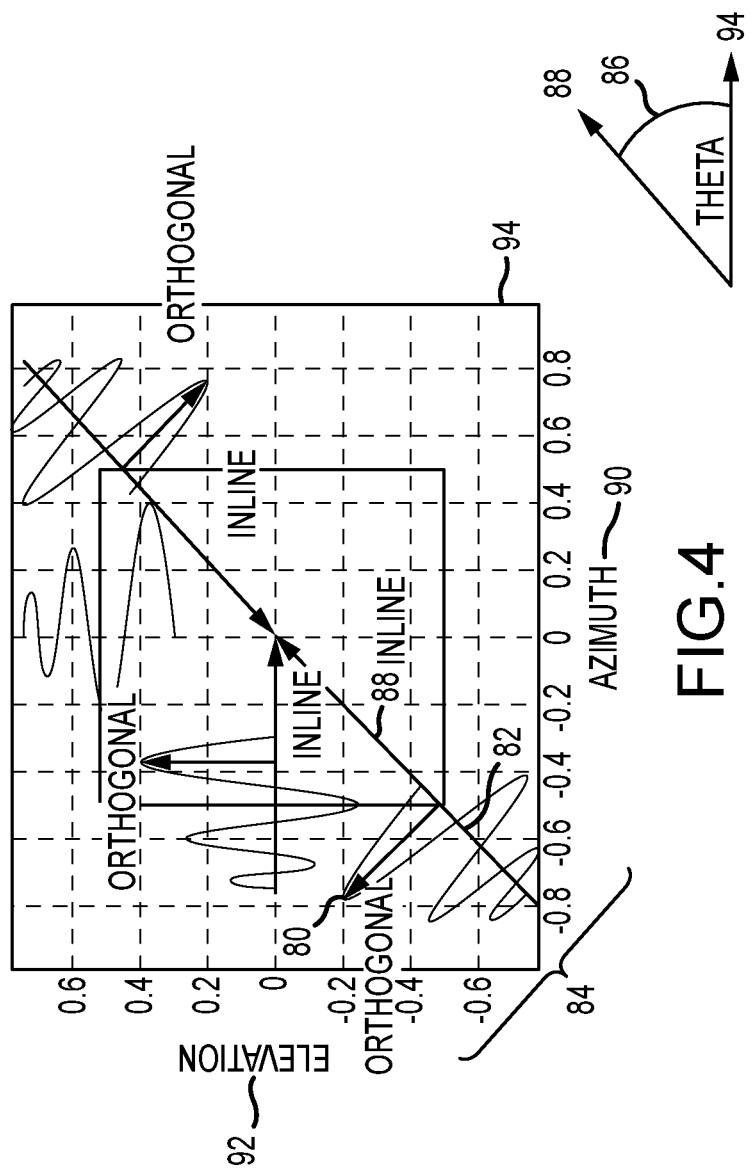
FIG. 4 is a plot of Az/El position on the tracker's FOV for an embodiment of the search area for different loss of track conditions for the missile illustrating the transformation of actuator commands from the tracker coordinate system to the projectile coordinate system.

Referring now to FIG. 4, in an embodiment the recapture module 50 generates at least an orthogonal component 80 as a time-based alternating signal (e.g., sine wave, triangle etc.) and possibly an inline component 82 in a tracker coordinate system to define a generic search area 84. Using an angle theta 86 between a straight-line path 88 in the tracker coordinate system defined by the last valid actuator command and an Azimuth axis 94, the recapture module 50 transforms the orthogonal and inline components 80, 82 into Az and El components 90, 92, respectively, in a projectile coordinate system. As shown, the orthogonal and inline components 80, 82 and generic search area 84 are independent of the straight-line path 88. The Az and El components 90, 92 are a function of both the orthogonal and inline components 80, 82 and the straight-line path 88.

In this example, angle theta 86 is defined as the angle between inline component 82 (straight-line path 88) and the Azimuth axis 94. The matrix transformation is given by:

$$\begin{vmatrix} Az \\ El \end{vmatrix} = \begin{vmatrix} \cos(theta) & -\sin(theta) \\ \sin(theta) & \cos(theta) \end{vmatrix} * \begin{vmatrix} \text{Inline} \\ \text{Orthogonal} \end{vmatrix} \quad (1)$$

Referring now to FIGS. 5a-5c, in an embodiment inline and orthogonal components 100, 102, respectively, form a delta actuator command 104 that defines a generic search area 106 in a tracker coordinate system. As shown, orthogonal component 102 is a time-based sine wave of increasing amplitude that defines the basic form of search area 106. A bias term may be added to the time-based sine wave to shape the area of vehicle motion. The bias term may include a ramp or exponential function of time. Inline component 100 represents an additional component to the last valid (and held) command that defines the straight-line path and is optional. If included, inline component 100 may include a constant term 108 or 110, a ramp 112 or an exponential function of time to control the rate of motion of the missile 12 along the straight-line path. As shown, delta actuator command 104, hence the search area 106 changes as a function of the inline component 100. The inline and orthogonal components 100, 102 may be selected as a function of at least one of an elapsed time of travel, a range to a target, a vehicle velocity, the straight-line path and an elapsed time since the last valid track. Selection may be affected by such factors as the energy efficiency of the resulting path or the ability of the missile 12 to reach the target.

Referring now to FIGS. 6a-6b through 10, differences in the existing and proposed recapture algorithms are illustrated for different loss of track conditions and different motion of the missile following loss of track.

In a first example shown in FIGS. 6a-6b and 7a-7b, a missile 200 leaves the tracker's FOV 202 following a path 204 horizontally to the left and undergoes no motion following the loss of track prior to execution of the recapture maneuver. As shown in FIG. 6a, following the existing recapture algorithm, the last actuator command is held to place the missile on a straight-line path 206 back towards the expected location of the desired position in the tracker's FOV 202. As shown in FIG. 6b, following the proposed recapture algorithm, a delta actuator command that follows a time-based alternating signal of increasing amplitude is added to the last actuator command (held) to place the missile on an alternating path 212 about straight-line path 206 back towards the expected location of the desired position in the tracker's FOV 202.

As shown in FIGS. 7a-7b, the last actuator command includes an Az component 214 that moves the missile 200 to the right and an El component 216 to counteract the effects of gravity. Together these components would place the missile 200 on a straight-line path horizontally to the right back towards the tracker's FOV 202.

These components are the same for both the existing and proposed recapture algorithms. As previously shown in FIGS. 5a-5c, the delta actuator command includes a ramp inline component 112 and an increasing amplitude sine wave orthogonal component 102. Because theta is zero in this example, the Az component 218 equals the inline component 112 and the El component 220 equals the orthogonal component 102 per the matrix transformation in equation 1.

A total Az component 222 is the sum of Az components 214 and 218 and a total El component 224 is the sum of El components 216 and 220.

The existing recapture algorithm follows a straight-line path back towards the tracker's FOV. The proposed recapture algorithm increases the search area with respect to the FOV and thus provides a higher likelihood of intersecting the tracker's FOV. In this case because there was no unknown motion of the missile after loss of track, both the existing and proposed recapture algorithms result in a successful recapture.

Figure 8B:
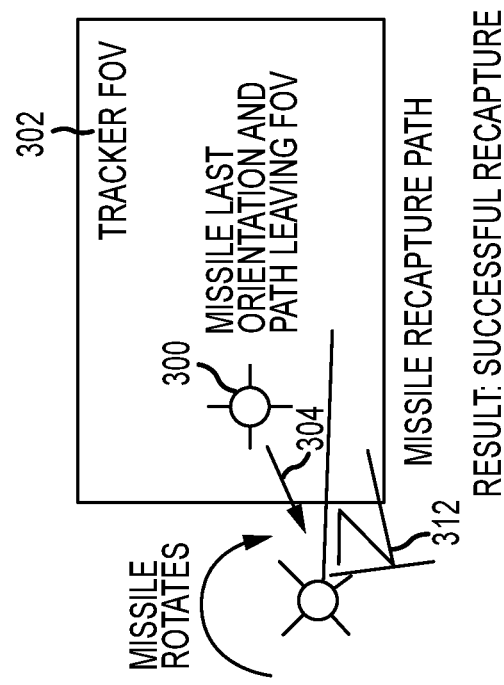
FIGS. 8a and b illustrate a straight-line recapture path for the last valid command held and alternating recapture path for the total actuator command for the missile leaving the FOV at a 45 degree angle to the left and undergoing a rotation resulting in a failed recapture for the straight-line recapture path and a successful recapture for the alternating recapture path.
Figure 8A:
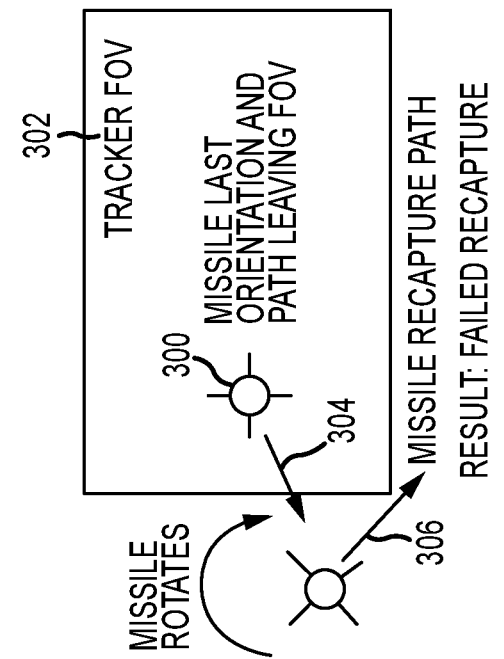
Figure 9:
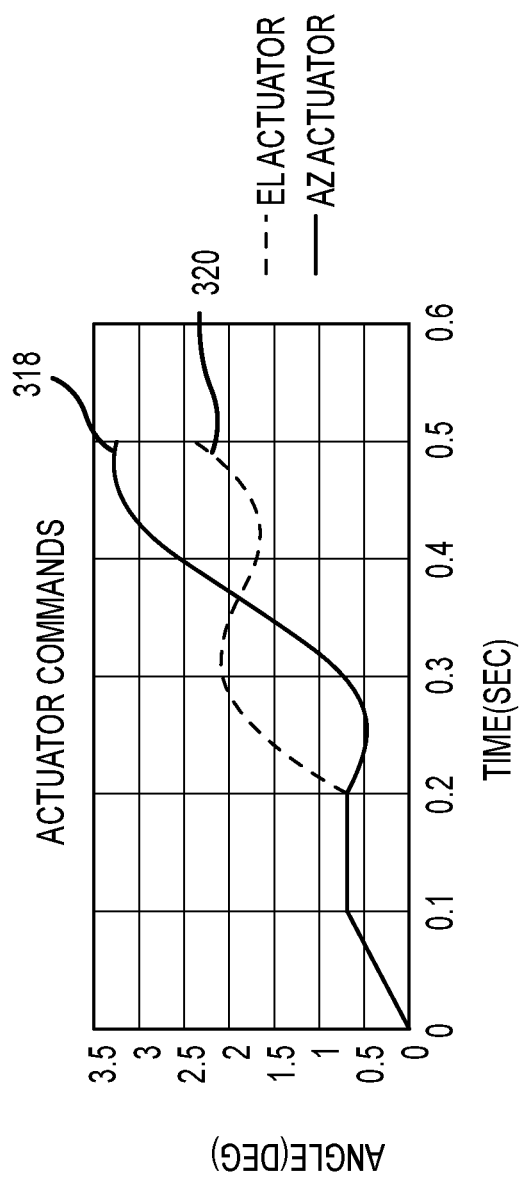
FIG. 9 illustrates the Azimuth and Elevation actuator commands rotated into projectile coordinate space for a missile leaving the FOV at the 45 angle to the left and undergoing rotation as shown in FIG. 8b and the recapture path of FIGS. 5a-5c.

In a second example shown in FIGS. 8a-8b and 9, a missile 300 leaves a tracker's FOV 302 following a path 304 at an angle theta of 45 degrees to the left and undergoes a clockwise rotation of approximately 90 degrees following the loss of track prior to execution of the recapture maneuver. As shown in FIG. 8a, following the existing recapture algorithm, the last valid actuator command is held to place the missile 300 on a straight-line path 306 back towards the expected location of the desired position in the tracker's FOV 302 based on the last valid position of the missile 300, resulting in a failed recapture. As shown in FIG. 8b, following the proposed recapture algorithm, a delta actuator command that follows a time-based alternating signal of increasing amplitude is added to the last actuator command (held) to place the missile 300 on an alternating path 312 about straight-line path 306 back towards the expected location of the desired position in the tracker's FOV 206, resulting in a successful recapture. Because theta is 45 degrees in this example, the Az and El components 318, 320, respectively, are a composite of any additional inline component and the orthogonal component. In this case, because of the rotation of the missile following loss of track, the straight-line path provided by the existing recapture algorithm fails to recapture the tracker's FOV eventually producing an abort command. However, the alternating path around the straight-line path provided by the proposed recapture algorithm intersects and successfully recaptures the tracker's FOV.

In a third example shown in FIGS. 10a-10b, a missile 400 leaves the tracker's FOV 402 following a path 404 at an angle theta of 45 degrees to the left and undergoes an abrupt vertical shift following the loss of track prior to execution of the recapture maneuver. As shown in FIG. 10a, following the existing recapture algorithm, the last actuator command is held to place the missile 400 on a straight-line path 406 back towards the expected location of the desired position in the tracker's FOV 402 based on the last valid position of the missile 400, resulting in a failed recapture. As shown in FIG. 10b, following the proposed recapture algorithm, a delta actuator command that follows a time-based alternating signal of increasing amplitude is added to the last actuator command (held) to place the missile on an alternating path 412 about straight-line path 406 back towards the expected location of the desired position in the tracker's FOV 406, resulting in a successful recapture. Because theta is 45 degrees in this example, the Az and El components are a composite of any additional inline component and the orthogonal component. In this case, because of the abrupt vertical shift of the missile following loss of track, the straight-line path provided by the existing recapture algorithm fails to recapture the tracker's FOV eventually producing an abort command. However, the alternating path around the straight-line path provided by the proposed recapture algorithm intersects and successfully recaptures the tracker's FOV.

The proposed recapture algorithm provides for a more robust recapture of the missile given the possibility of unknown missile motion (e.g., rotation or shift) after track is lost and prior to initiating recapture than the existing straight-line recapture algorithm. The penalty is reduced energy efficiency.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of recapture of a remotely tracked command guided vehicle within a tracker's field-of-view (FOV), the vehicle including a plurality of actuators configured to perform maneuvers in first and second mutually orthogonal directions, the method comprising:
   upon loss of a valid track of the vehicle,
   a) holding a last actuator command as a nominal actuator command that maneuvers the vehicle on a straight-line path from a last known position of the vehicle towards the tracker's FOV;
   b) generating a delta actuator command including an orthogonal component orthogonal to the straight-line path as a next sample of a time-based alternating signal;
   c) summing the nominal actuator command and the delta actuator command to generate a total actuator command;
   d) transmitting the total actuator command from the remote tracker to the vehicle to control the plurality of actuators to command guide the vehicle to maneuver in the first and second orthogonal directions back and forth across the straight-line path to increase an area of vehicle motion relative to the tracker's FOV; and
   repeating steps (a) through (d) until the vehicle re-enters the tracker's FOV and valid track is re-established or track is lost.

2. The method of claim 1, wherein the time-based alternating signal increases in amplitude with time.

3. The method of claim 1, wherein generating the orthogonal component further comprises adding a bias term to the time-based alternating signal to shape the area of vehicle motion.

4. The method of claim 3, wherein the bias term includes a constant, ramp or exponential function of time.

5. The method of claim 1, wherein generating the delta actuator command further includes generating an inline component inline with the straight-line path to control the rate of motion of the vehicle along the straight-line path.

6. The method of claim 5, wherein the inline component includes a constant, ramp or exponential function of time.

7. The method of claim 5, wherein generating the delta actuator command comprises generating initial inline and orthogonal components in a tracker coordinate system and using an angle of the straight-line path in the tracker coordinate system to transform the initial inline and orthogonal component into the inline and orthogonal components in a projectile coordinate system.

8. The method of claim 7, wherein the inline and orthogonal components in the projectile coordinate system are defined by combinations of azimuth and elevation components that move the vehicle in the first and second orthogonal directions.

9. The method of claim 1, wherein the delta actuator command is a function of at least one of an elapsed time of travel, a range to a target, range from launcher, a vehicle velocity, the straight-line path and an elapsed time since the last valid track.

10. The method of claim 1, wherein the vehicle is a land, air, sea or space based vehicle.

11. The method of claim 1, wherein the actuators comprise aerodynamic control surfaces, thrusters or propellers.

12. The method of claim 1, wherein the commands are transmitted over a wire, WIFI, radio, laser, optical or infrared link to the vehicle.

13. The method of claim 1, wherein the commands transmitted to the vehicle are analog, digital or bang-bang.

14. The method of claim 1, wherein the remote tracking uses optical, infrared, radar or sonar sensing to determine vehicle position in the FOV.

15. A method of recapture of an remotely tracked missile within a tracker's field-of-view (FOV), the missile including a plurality of actuators configured to perform maneuvers in first and second mutually orthogonal directions, the method comprising:
  upon loss of a valid track of the missile,
    (a) holding a last actuator command as a nominal actuator command in a projectile coordinate system that maneuvers the missile on a straight-line path from a last known position of the missile towards the tracker's FOV;
    (b) generating a delta actuator command including an orthogonal component orthogonal to the straight-line path as a next sample of a time-based alternating signal and an inline component inline with the straight-line path;
    (c) using an angle of the straight-line path in the tracker coordinate system to transform the delta actuator command into a projectile coordinate system,
    (d) summing the nominal actuator command and the delta actuator command in the projectile coordinate system to generate a total actuator command;
    (e) transmitting the total actuator command from the remote tracker to the missile to control the plurality of actuators to command guide the missile to maneuver in the first and second orthogonal directions back and forth across the straight-line path to increase an area of missile motion relative to the tracker's FOV; and
  repeating steps (a) through (e) until the missile re-enters the tracker's FOV and valid track is re-established or track is lost.

16. A remotely tracked command guided missile system, comprising:
  a missile including a motor and a plurality of actuators configured to maneuver the missile in first and second mutually orthogonal directions in a projectile coordinate system; and
  a missile launcher comprising,
    a platform for launching the missile,
    a sight for placement of cross-hairs on a target;
    a sensor having a tracker field of view (FOV) that includes the cross-hairs;
    a communication link between the missile launcher and the missile;
    a guidance computer including
      a signal processor coupled to the sensor and configured to set a track valid flag if the missile is detected in the FOV and to generate a measured missile position in the FOV,
      a first summing node configured to form a difference of the measured missile position and a desired missile position in the FOV as an error signal,
      a controller configured to generate a new nominal actuator command based on the error signal if the track valid flag is true and hold a last valid nominal actuator command to place the missile on a straight-line path from a last known position of the missile towards the desired missile position in the FOV if the track valid flag is false;
      a recapture module implemented by the signal processor configured to generate a delta actuator command including an orthogonal component orthogonal to the straight-line path as a next sample of a time-based alternating signal; and
      a second summing node configured to sum the nominal actuator command and the delta actuator command to form a total actuator command; and
    a transmitter configured to transmit the total actuator command from the missile launcher over the communication link to the missile in flight to the control surface actuator to control the plurality of actuators to command guide the missile to maneuver in the first and second orthogonal directions back and forth across the straight-line path to increase an area of missile motion relative to the tracker's FOV until the signal processor determines that the missile re-enters the tracker's FOV and valid track is re-established setting the track valid flag to true or track is lost setting the track valid flag to false.

17. The remotely tracked command guided missile system of claim 16, wherein the time-based alternating signal increases in amplitude with time.

18. The remotely tracked command guided missile system of claim 16, wherein the orthogonal component further includes a bias term to shape the area of missile motion.

19. The remotely tracked command guided missile system of claim 16, wherein the delta actuator command further includes an inline component inline with the straight-line path to control the rate of motion of the missile along the straight-line path.

20. The remotely tracked command guided missile system of claim 16, wherein the recapture module generates the delta actuator command by generating an initial orthogonal component in a tracker coordinate system and using an angle of the straight-line path in the tracker coordinate system to transform the orthogonal component into the orthogonal component in a projectile coordinate system.

* * * * *